United States Patent [19]

Kobori et al.

[11] Patent Number: 4,529,290

[45] Date of Patent: Jul. 16, 1985

[54] OPERATION MODE DISPLAY DEVICE FOR PICTURE TAKING DEVICES

[75] Inventors: Toshio Kobori, Sakai; Nobuyuki Taniguchi, Tondabayashi; Takanobu Omaki, Sennan; Masaaki Nakai, Kawachinagano, all of Japan

[73] Assignee: Minolta Camera Kabushiki Kaisha, Osaka, Japan

[21] Appl. No.: 641,391

[22] Filed: Aug. 16, 1984

[30] Foreign Application Priority Data

Oct. 11, 1983 [JP] Japan .......................... 58-157432[U]

[51] Int. Cl.$^3$ .............................................. G03B 7/08
[52] U.S. Cl. ..................................... 354/442; 354/474
[58] Field of Search ............... 354/441, 442, 443, 471, 354/474, 475, 289.1, 289.12

[56] References Cited

U.S. PATENT DOCUMENTS

| 4,173,401 | 11/1979 | Harvey ................................. 354/475 |
| 4,304,472 | 12/1981 | Shinoda et al. ...................... 354/475 |
| 4,461,560 | 7/1984 | Yoshino et al. ...................... 354/475 |

FOREIGN PATENT DOCUMENTS

| 0013331 | 2/1977 | Japan ................................... 354/475 |
| 0107340 | 8/1979 | Japan ................................... 354/475 |

*Primary Examiner*—Russell E. Adams
*Attorney, Agent, or Firm*—Watson, Cole, Grindle & Watson

[57] ABSTRACT

An operation mode display device is provided for a picture taking device such as a camera which controls exposure in a plurality of modes such as a programmed automatic exposure control mode, a diaphragm priority automatic shutter speed control mode, a shutter speed priority automatic diaphragm control mode and a manual exposure control mode. A plurality of display devices are individually operable for displaying a letter for each display means and arranged in a single line to display the letters P, R, O, G, R, A, M and S in order of mention. When the programmed automatic control mode, which is the most frequently used mode in practice, has been selected, all or almost all of the display devices are driven to display the letters "PROGRAMS" or "PROGRAM". When another mode, e.g., the diaphragm priority automatic shutter speed control mode has been selected, one of the display devices is driven to display a single letter "A". Similarly, the letter "S" is displayed when the shutter speed priority automatic diaphragm control mode is selected, and the letter "M" is displayed when the manual exposure control mode is selected. The invention is also applicable to a display of a single and continuous photographic operation of a motor driven camera. In this case, "CONTINUOUS" may be displayed with full letters.

7 Claims, 11 Drawing Figures

FIG.3
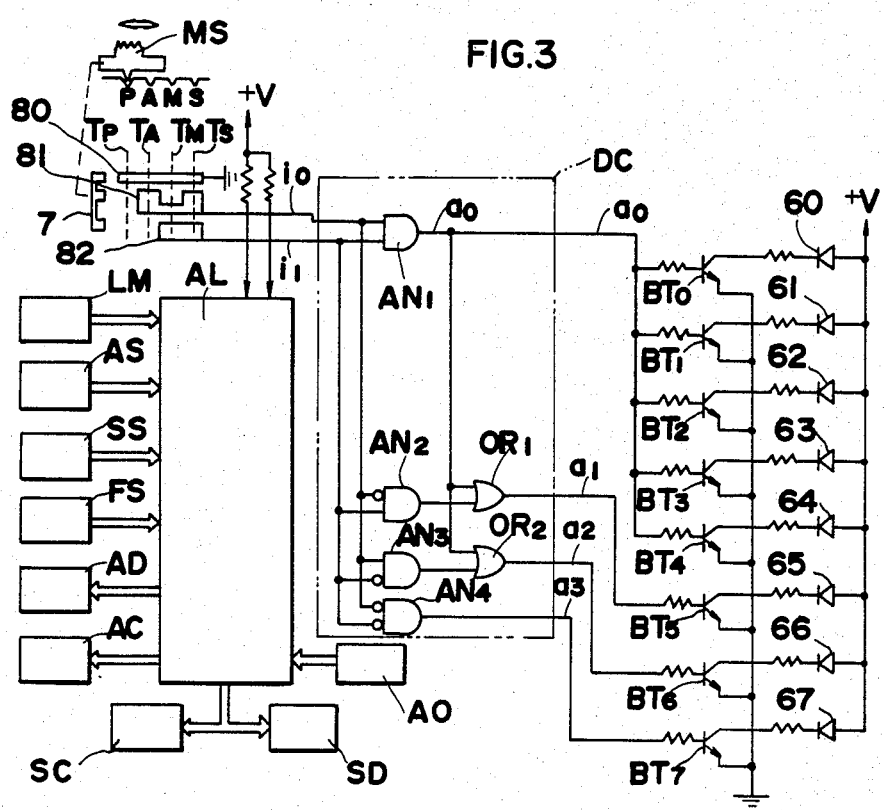
FIG.4
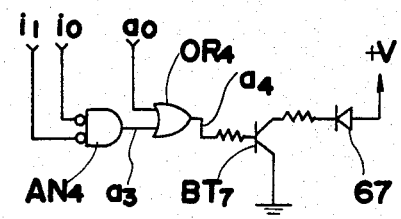
FIG.5
| P R O G R A M S |
FIG.6
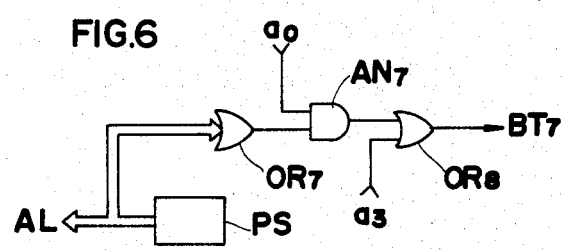
FIG.7
(a) | C O N T I N U O U S |
(b) | S |

OPERATION MODE DISPLAY DEVICE FOR PICTURE TAKING DEVICES

BACKGROUND OF THE INVENTION

1. Field of the Invention

The present invention relates to a display device for indicating operation modes set in a picture taking device such as a photographic camera which controls exposure in a plurality of modes such as a programmed automatic exposure control mode (hereinafter referred to as P-mode), a diaphragm priority automatic exposure time control mode (hereinafter referred to as A-mode), an exposure time or shutter speed priority automatic diaphragm control mode (hereinafter referred to as S-mode) and a manual exposure control mode (hereinafter referred to as M-mode), or an automatic film wind-up device which drives a film wind-up and shutter mechanism in a camera in a continuous exposure mode and a one shot exposure mode. It should be noted that the term picture taking device should be read hereinafter to include various devices for use in picture taking, i.e. not only a photographic camera but also its accessories such as a motor driven wind-up device and a flash device.

2. Description of the Prior Art

Most picture taking devices are designed to operate in various modes any one of which is selected by a change-over operation, and to display the selected operation mode. Heretofore, the operation mode is mainly indicated by a mark. However, as the number of operation modes to be effected increases, the kinds of marks to be displayed increases so that it becomes difficult to understand and distinguish the meaning of the marks. Hence, it has been desired that the display is made in a form which definitely shows its meaning and is easily understood by the user. Taking the display of exposure control modes, it is difficult for the user to understand the definite property of an individual exposure control mode when the modes are indicated by initials "P", "A", "S" and "M" of the term properly showing the control modes. Especially, in the case of indicating the P-mode which is most frequently used in practice and is significant, it is favorable to the user if the P-mode is indicated by the full letters "PROGRAM" rather than by its initial "P" as is done for A-, S- and M-modes. The user can understand the definite property of the P-mode from the full letter indication. However, as the display device is located on a part of the surface of a picture taking device, it is difficult from the technical view point to assign as-much-as-possible space to the display device. Hence, if it is contemplated that full letters are displayed for the P-mode and only the initial is displayed for each of the other modes in the same limited space, the letters for the indication of the P-mode must be extremely small in size so that the unbalance of the letter size between the display for the P-mode and the display for the other modes will be seen as unnatural by the user. This problem may be avoided if the displays for the P-mode and the other modes are to be made in different spaces which are adjacent to each other. However, such a display is unfavorable not only because it requires a large space for both displays but also because the displays for the P-mode and the other modes appear at different locations in spite of the fact that they indicate the same kind of camera operation, i.e. the exposure control mode. Owing to the above discussed problem, no satisfactory exposure control mode display device for picture taking devices has been proposed.

SUMMARY OF THE INVENTION

An object of the present invention is to provide an operation mode display device which indicates a set one of a plurality of operation modes of a picture taking device in a manner that the user can easily recognize the definite property of the mode being indicated.

Another object of the present invention is to provide an operation mode display device which indicates all the modes with a line of letters in a space assigned for the single letter line, with the sizes of the letters being equal to each other for all the modes.

Still another object of the present invention is to provide an operation mode indicating device which indicates a significant one of a plurality of operation modes in a manner that the user can understand the indication thereof from the indication of the other mode.

The present invention is designed such that, from a plurality of operation modes of a picture taking device, the most frequently used mode, i.e., the most significant mode is indicated by the full letters of a word properly showing the operation and each of the other modes is indicated by a single letter which is selected from the full letters from the significant mode indication and which properly shows the mode.

According to the present invention, a significant one of a plurality of operation modes is indicated by full letters of the word that properly show the operation mode while the other modes are indicated by a single letter selected from the full letters and a few other letters added as the case demands, so that all the modes are indicated by letters of the same size within a space assigned to a single letter line. Additionally, instead of the indication of every mode by a single letter, the present invention indicates a most frequently used significant mode by full letters of a word to definitely inform the user the meaning of the significant mode. Further, the present invention will not require an increase of space for the display and presents an easily recognizable display wherein letters of the same size are used for the display of the full letters as well as for the display of a single letter. Still further, as the indication of the same kind of operation modes, e.g. the indication of exposure control modes is made on or in the same single line so that the indication is natural and a good appreciation of the usage is given.

These and other objects, advantages, features and uses will become more apparent with the following description, when considered with the accompanying drawings.

BRIEF DESCRIPTION OF THE DRAWINGS

FIG. 3 is a circuit diagram showing a display control circuit for the display of the patterns shown in FIGS. 2(a) through 2(d);

FIG. 4 is a circuit diagram showing the essential portion of a display control circuit for displaying a pattern different from those shown in FIG. 2;

FIG. 5 is an illustration of the pattern displayed by the circuit of FIG. 4;

FIG. 6 is a circuit diagram showing the essential part of a display control circuit for displaying a pattern which is different from those shown in FIG. 2(a) and FIG. 5; and FIGS. 7(a) and 7(b) are illustrations of display patterns for operation modes according to another embodiment of the present invention.

DESCRIPTION OF THE PREFERRED EMBODIMENTS

Figure 1:
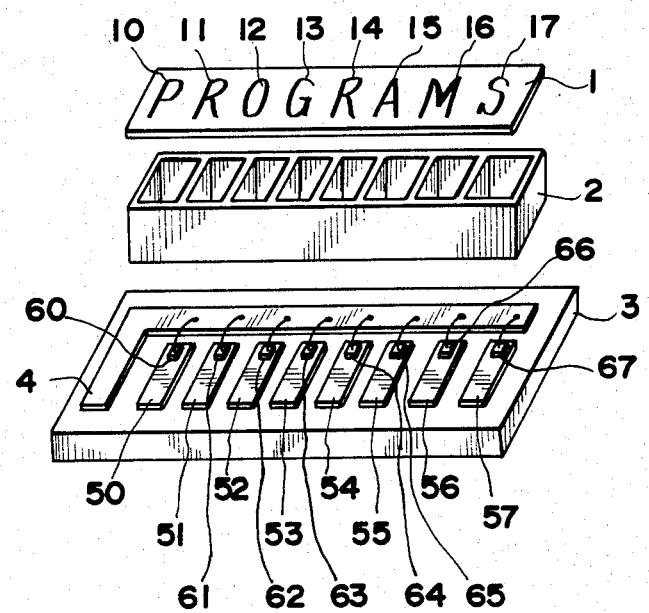
FIG. 1 is an exploded perspective view showing the components of the display unit of the display device according to an embodiment of the present invention.

FIG. 1 shows the display unit of the first embodiment of the present invention which embodiment selectively indicates four exposure control modes as mentioned before. With reference to FIG. 1, display panel 1 is composed of a light scattering transparent film or thin plate with opaque portions in the form of letters "P", "R", "O". "G", "R", "A", "M", and "S" designated by reference numerals 10 to 17. Light restricting frame 2 has eight rectangular openings in alignment with letters 10 to 17. Circuit board 3 is formed, on a surface thereof, with electrodes 50 to 57 and common electrode 4. Light emitting diodes (LEDs) 60 to 67 are die-bonded at their cathodes to electrodes 50 to 57. The anodes of the LEDs are wire-bonded to common electrode 4. LEDs 60 to 67 are located as positions to be in alignment with letters 10 to 17 so that only the letters in alignment with energized LEDs are displayed as a shadow in bright background when display panel 1, light restricting frame 2 and printed circuit board 3 are assembled as a unit.

Figure 2:
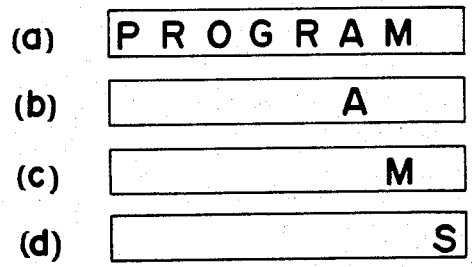
FIGS. 2(a) through 2(d) are schematic illustrations of exemplary display patterns for the display of respective operation modes and which are displayed in the display portion of the unit shown in FIG. 1.

FIG. 2 shows the display pattern for the indication of exposure modes according to the embodiment described above.

FIG. 2(a) shows the display pattern for the indication of the programmed automatic exposure control mode (P-mode). In this case, LEDs 60 to 66 corresponding to all of the letters P, R, O, G, R, A, M and S except the last one "S" are energized to display the letters "PROGRAM". In the case of FIG. 2(b) showing the display pattern for the indication of the diaphragm aperture priority automatic shutter speed control mode (A-mode), only the letter "A" (designated by 15) of the letters "PROGRAMS" is selectively illuminated and displayed. FIG. 2(c) shows the display pattern for the indication of the manual exposure control mode (M-mode). In this case, only the letter "M" referred by numeral 16 is selectively displayed. In the case of FIG. 2(d) showing the shutter speed priority automatic diaphragm control mode (S-mode), only the last letter "S" is displayed.

FIG. 3 shows a LED energization control circuit for the selective display of the patterns shown in FIGS. 2(a) through 2(d). Exposure mode setting member MS is moved selectively to P, A, M and S positions for the setting of the P-mode, A-mode, M-mode and S-mode. Slider or sliding contact 7 slides in the lateral direction as viewed in the Figure in response to the manual operation of exposure mode setting member MS to be brought into engagement with electrodes 80, 81 or 82. It should be understood that positions $T_P$, $T_A$, $T_M$ and $T_S$ where slider 7 is to be set along the electrodes correspond to the setting positions P, A, M and S of exposure control mode setting member MS. Electrodes 80, 81 and 82 have respective patterns as shown in the Figure. Electrode 80 is connected to the negative terminal of a power source while electrodes 81 and 82 are connected through pull-up resistors to the positive terminal of the power source.

With this construction, from output lines i0 and i1 of electrodes 81 and 82 are output a pair of level signals depending on the exposure control mode set by exposure mode setting member MS. In more detail, the output signals from output lines i0 and i1 are respectively "High" and "High" for the P-mode, "Low" and "High" for the A-mode, "High" and "Low" for the M-mode and "Low" and "Low" for the S-mode. Operational control circuit AL performs exposure calculation depending on the output signals from output lines i0 and i1, i.e. in accordance with a set exposure mode and furnishes control signals to diaphragm aperture control means AC, diaphragm aperture indicating means AD, shutter control means SC, shutter speed indicating means SD and other circuits. The portion DC enclosed by chain line is a display control circuit. The circuit is composed of four AND gates AN1 through AN4 and two OR gates OR1 and OR2 and has four output lines a0 through a3. Each AND gate is connected at its input terminals to output lines i0 and i1. Table 1 shows the relationships between the inputs and outputs of display control circuit DC.

TABLE 1

| Mode | i1 | i0 | a3 | a2 | a1 | a0 |
|---|---|---|---|---|---|---|
| P | H | H | L | H | H | H |
| A | H | L | L | L | H | L |
| M | L | H | L | H | L | L |
| S | L | L | H | L | L | L |

LEDs 60 through 67 are respectively connected with driver transistors BT0 through BT7. Table 2 shows the correspondence between the driver transistors and letters to be displayed. The bases of the respective transistors are connected with output lines a0 through a3 of display control circuit DC as shown in the same table.

TABLE 2

| P | R | O | G | R | A | M | S |
|---|---|---|---|---|---|---|---|
| BT0 | BT1 | BT2 | BT3 | BT4 | BT5 | BT6 | BT7 |
| a0 | a0 | a0 | a0 | a0 | a1 | a2 | a3 |

With the circuit construction described above, in the case of the P-mode, the output levels of output lines a0 through a2 are "High" and only that of output line a3 is "Low" so that transistors BT0 through BT6 conduct to energize LEDs 60 through 66 which are respectively in alignment with the letters "PROGRAM", thereby making display of the pattern as shown in FIG. 2(a). For the A-mode, only the output level of output line a1 is "High" so that only transistor BT5 conducts to energize LED 65 which is in alignment with the letter "A", thereby displaying the pattern as shown in FIG. 2(b). In like manner, LED 66 in alignment with the letter "M" is energized for the M-mode to display the pattern shown in FIG. 2(c) and LED 67 in alignment with the letter "S" is energized for the S-mode to display the pattern shown in FIG. 2(d).

The following explanation concerns another display form as a modification of the display pattern shown in FIG. 2. In this case, display control circuit DC of FIG. 3 may be modified for the circuit portion for the control of LED 67. FIG. 4 shows only the modified portion. In this modification, the letter "S" is not only displayed by itself for the S-mode under the action of AND gate AN4 and OR gate OR4 but also displayed together with other letters "PROGRAM" for the P-mode under the action of OR gate OR4. Thus, for the P-mode, all the letters "PROGRAM" shown in FIG. 1 are displayed, indicating that the camera can be controlled in a plurality of P-modes. The modified embodiment may be applied to the display of the P-mode for a camera controlled in a plurality of modes as in the case wherein the line of the program can be changed for the P-mode in accordance with the focal length of the exchangeable lens being used.

The following explanation is directed to still another display form as a further modification of the display pattern shown in FIG. 2. This modification may be applied to a camera wherein the exposure program can be manually shifted for the P-mode from a standard program. In this case, the camera operation according to the standard program is indicated by the display of "PROGRAM" and the camera operation according to shifted program is displayed by the display of "PROGRAMS". FIG. 6 shows only the portion of the circuit for such a display and the portion common to the circuit of FIG. 3 is omitted for the convenience and simplicity of illustration. When the S-mode is set, only the signal at output line a3 becomes "High" as in the embodiment of FIG. 3, so that driver transistor BT7 is made conductive by OR gate 8 to energize LED 67 thereby displaying the letter "S". When the P-mode is set, the signal at output line a0 becomes "High". In the circuit of FIG. 6, manual program shifting means PS for outputting a data signal for shifting the line of the program is connected between the input terminal of operational control circuit AL and the input terminal of OR gate OR7. When the line of the program is not shifted, manual program shifting means PS does not output the shifting data signal so that the output of OR gate OR7 remains "Low". Accordingly, the output of AND gate AN7 also remains "Low" so that the letter "S" is not displayed but the letters "PROGRAM" are displayed. On the other hand, when the line of the program is shifted, manual program shifting means PS supplies operational control circuit AL with data of the amount of program shifting and at the same time makes the output of OR gate OR7 "High". Accordingly both input terminals of AND gate AN7 become "High" to make transistor BT7 conductive and display "PROGRAMS".

Returning to FIG. 3, block AO is a means for supplying operational control circuit AL with data of full open aperture value Avo of the camera objective lens. Block LM is a means for supplying operational control circuit AL with data (Bv−Avo) representative of the brightness of an object to be photographed (object brightness) Bv measured through a camera objective lens and fully opened diaphragm aperture. Block AS is a means for supplying data of a manually set diaphragm aperture value Avs to operational control circuit AL. Block SS supplies operational control circuit AL with data of manually set shutter speed value Tvs. Block FS supplies data of film speed value Sv to operational control circuit AL. Thus, operational control circuit AL performs exposure calculations basing on input data Avo, (Bv−Avo), Avs, Tvs and Sv. At first, operational control circuit AL calculates (Bv−Avo)−Avo and obtains the object brightness value Bv. Then, in the case of the P-mode, the control circuit AL performs calculations of $(Bv+Sv)\cdot\alpha = Av$ and $(Bv+Sv)(1-\alpha) = Tv$ to obtain data of diaphragm aperture value Av and exposure time value Tv which data are supplied to control means AC, SC or the like. In the above calculation, coefficient $\alpha$ is determined in accordance with a selected program. Operational control circuit AL calculates $(Bv+Sv)-Avs=Tv$ for the A-mode and $(Bv+Sv)-Tvs=Avx$ for the S-mode to output calculated data to control means SC or AC.

The above described embodiment was for displaying the exposure control mode. However, as explained before, the present invention is not limited to this application. For example, in a camera with a built-in motor driven or automatic film wind-up device, a display form may be possible wherein the continuous wind-up mode or continuous picture taking mode which is frequently used may be indicated by display of the full letters "CONTINUOUS" as shown in FIG. 7(a), while the single shot or one frame picture taking mode may be indicated, as shown in FIG. 7(b), by a single letter "S" at the end of the above display.

Although an operation mode was indicated, in the above embodiments, by full letters of a word properly showing the operation, letters of a part of such a word or letters of a word that is quite different from the name of the operation mode, may be displayed in so far as the operation is explicitly explained in a simplified form. The display elements are also not limited to LEDs but may be any of Liquid Crystal Display (LCD), Electro Liminescence (EL), Electro Chromic Display (ECD) and the like.

While there has been described preferred forms of the invention, obviously modifications and variations are possible in light of the above teachings. It is therefore to be understood that within the scope of the appended claims, the invention may be practiced otherwise than as specifically described.

What is claimed is:

1. An operation mode display device for a picture taking device operable in a plurality of modes including a specific mode, comprising:
   a mode selector manually operable for selecting one of the modes;
   a plurality of display means individually operable for displaying a letter for each display means and arranged in a single line in the order to form the word of the specific mode;
   a display control means, responsive to the mode selection by said mode selector, for driving, under the selection of the specific mode, all of said display means to display full letters and for driving, with the selection of other modes, one of said display means to display a letter corresponding to the selected mode.

2. An operation mode display device according to claim 1, wherein said plurality of display means further includes an additional display means for displaying a letter representing an additional mode that can not be shown by the letters representing the specific mode, said additional display means being driven by said display control means only when the additional mode is selected by said mode selector.

3. An operation mode display device according to claim 2, wherein said picture taking device includes a camera which controls exposure in a programmed automatic exposure control mode, a diaphragm priority automatic shutter speed control mode, a shutter speed priority automatic diaphragm control mode and a manual exposure control mode, and said plurality of display means is arranged to display the letters P, R, O, G, R, A, M and S in order of mention and display "PROGRAM"

in combination when the programmed automatic exposure control mode has been selected.

4. An operation mode display device according to claim 3, wherein said camera further including a program shift means manually operable for shifting a line of the program from a standard program, and said display control means drives said plurality of display means, under selection of the programmed automatic exposure control mode, to display letters "PROGRAM" when said program shift means has not been operated and letters "PROGRAMS" when said program shift means has been operated.

5. An operation mode display device according to claim 1, wherein said picture taking device includes an automatic film wind-up device which controls film wind-up operation in a continuous mode and a single mode, and said plurality of display means is arranged to display the letters of C, O, N, T, I, N, U, O, U and S in order of mention and display "CONTINUOUS" with full letters when the continuous mode has been selected.

6. An exposure control mode display device for a camera which controls exposure in a plurality of modes including a programmed automatic exposure control mode, said device comprising:

a mode selector manually operable for selecting one of the modes;

a plurality of display means individually operable for displaying a letter for each and arranged in a single line to display the letters P, R, O, G, R, A, M and S in order of mention;

a display control means, responsive to the mode selection by said mode selector, for driving, under selection of the programmed automatic exposure control mode, at least some of said plurality of display means to display the letters "PROGRAM" and for driving, under selection of one of the other modes, one of said plurality of display means to display a letter corresponding to the selected mode.

7. An exposure control mode display device according to claim 6, wherein said plurality of modes further including a diaphragm priority automatic shutter speed control mode, a shutter speed priority automatic diaphragm control mode and a manual exposure control mode, and said display control means drives one of said plurality of display means to display the letters "A", "S", and "M" respectively for the diaphragm priority automatic shutter speed control mode, the shutter speed priority automatic diaphragm control mode and the manual exposure control mode.

* * * * *